United States Patent
Yamada et al.

(10) Patent No.: US 11,453,452 B2
(45) Date of Patent: Sep. 27, 2022

(54) STRADDLED VEHICLE AND LIGHTING DEVICE FOR STRADDLED VEHICLE

(71) Applicant: YAMAHA HATSUDOKI KABUSHIKI KAISHA, Iwata (JP)

(72) Inventors: Takahiro Yamada, Iwata (JP); Shizuka Miura, Iwata (JP)

(73) Assignee: YAMAHA HATSUDOKI KABUSHIKI KAISHA, Iwata (JP)

( * ) Notice: Subject to any disclaimer, the term of this patent is extended or adjusted under 35 U.S.C. 154(b) by 252 days.

(21) Appl. No.: 16/919,701

(22) Filed: Jul. 2, 2020

(65) Prior Publication Data
US 2021/0001942 A1 Jan. 7, 2021

(30) Foreign Application Priority Data
Jul. 3, 2019 (JP) .............................. JP2019-124737

(51) Int. Cl.
| | |
|---|---|
| *B62J 6/055* | (2020.01) |
| *B62J 6/26* | (2020.01) |
| *F21S 41/32* | (2018.01) |
| *F21S 43/247* | (2018.01) |

(52) U.S. Cl.
CPC ................ *B62J 6/055* (2020.02); *B62J 6/26* (2020.02); *F21S 41/322* (2018.01); *F21S 43/247* (2018.01)

(58) Field of Classification Search
CPC .. B62J 6/26; B62J 6/055; F21S 41/322; F21S 43/055
See application file for complete search history.

(56) References Cited

U.S. PATENT DOCUMENTS

| | | | | |
|---|---|---|---|---|
| 6,097,549 | A * | 8/2000 | Jenkins ................ | G02B 6/0021 362/520 |
| 7,470,042 | B2 * | 12/2008 | Ayabe .................. | G02B 17/086 362/348 |
| 10,260,693 | B1 | 4/2019 | Shih | |
| 2004/0141323 | A1 * | 7/2004 | Aynie .................... | F21S 43/245 362/308 |
| 2011/0261570 | A1 * | 10/2011 | Okada .................... | F21S 43/239 362/311.06 |
| 2012/0155103 | A1 * | 6/2012 | Okada ..................... | F21S 43/40 362/518 |

FOREIGN PATENT DOCUMENTS

| | | |
|---|---|---|
| FR | 2841966 A1 | 1/2004 |
| FR | 2846400 A1 | 4/2004 |
| JP | 2005327649 A | 11/2005 |
| JP | 2009158409 A | 7/2009 |
| JP | 2016091846 A | 5/2016 |
| JP | 2018032487 A | 3/2018 |

\* cited by examiner

*Primary Examiner* — Eric T Eide
(74) *Attorney, Agent, or Firm* — Rabin & Berdo, P.C.

(57) ABSTRACT

A first inclined surface and a second inclined surface are inclined with respect to an optical axis of a light emitting diode. The first inclined surface guides light from the light emitting diode guided in the first light transmitting portion toward an outside of an outer lens. An inclination angle of the second inclined surface with respect to the optical axis is larger than an inclination angle of the first inclined surface with respect to the optical axis. The second inclined surface reflects the light from the light emitting diode guided in the first light transmitting portion toward the second light transmitting portion and guides the light into the second light transmitting portion.

18 Claims, 10 Drawing Sheets ically formed, the degree of freedom of the light guide path in the outer lens is low. Therefore, it is more difficult to emit light from a single light emitting diode over a wide range of the non-overlapping portion.

An object of the present invention is to improve a conspicuity of a lighting device for a straddled vehicle that includes a light emitting diode and has a shape that is long in a direction perpendicular to an optical axis of the light emitting diode.

A first aspect according to the present invention is a lighting device for a straddled vehicle. The lighting device includes a housing, a single light emitting diode, and an outer lens. The outer lens is transparent and is attached to the housing. The outer lens extends in a direction perpendicular to an optical axis of the light emitting diode. The outer lens includes a first light transmitting portion and a second light transmitting portion. The first light transmitting portion overlaps the light emitting diode in an optical axis direction of the light emitting diode. The second light transmitting portion is arranged at a position not overlapping with the light emitting diode in the optical axis direction. The first light transmitting portion and the second light transmitting portion are formed integrally. The second light transmitting portion is longer than the first light transmitting portion in the longitudinal direction of the outer lens.

The first light transmitting portion includes a first inclined surface and a second inclined surface. The first inclined surface is provided on an outer surface of the first light transmitting portion. The first inclined surface is inclined with respect to the optical axis of the light emitting diode. The second inclined surface is provided on the outer surface of the first light transmitting portion. The second inclined surface is inclined with respect to the optical axis of the light emitting diode. The first inclined surface guides light from the light emitting diode guided in the first light transmitting portion toward the outside of the outer lens. The inclination angle of the second inclined surface with respect to the optical axis is larger than the inclination angle of the first inclined surface with respect to the optical axis. The second inclined surface reflects the light from the light emitting diode guided in the first light transmitting portion toward the second light transmitting portion and guides the light into the second light transmitting portion.

In the lighting device according to the present aspect, the light from the light emitting diode guided in the first light transmitting portion passes through the first inclined surface and is irradiated toward the outside of the outer lens. Further, the light from the light emitting diode guided in the first light transmitting portion is reflected by the second inclined surface toward the second light transmitting portion. Thereby, the light from the light emitting diode is guided in the second light transmitting portion. Therefore, the light from the single light emitting diode can be divided into the first light transmitting portion and the second light transmitting portion and irradiated outward.

The inclination angle of the second inclined surface with respect to the optical axis is larger than the inclination angle of the first inclined surface with respect to the optical axis. Therefore, although the second light transmitting portion is longer than the first light transmitting portion in the longitudinal direction of the outer lens, it is possible to spread the light over a wide area of the second light transmitting portion. Thus, the conspicuity of the lighting device can be improved while suppressing an increase in manufacturing cost.

An inner surface of the second light transmitting portion may include a reflection surface. The reflection surface may reflect the light guided into the second light transmitting portion from the second inclined surface toward the outside of the outer lens. In this case, it is possible to irradiate light from the second light transmitting portion over a wide range by the reflection surface.

The reflection surface may include a plurality of inclined surfaces. In this case, the plurality of inclined surfaces can irradiate light from the second light transmitting portion over a wider range.

Each of the inclined surfaces may have a curved shape. In this case, the inclined surfaces can irradiate light from the second light transmitting portion over a wider range.

The reflection surface may include a first extending portion and a second extending portion. The first extending portion may extend in a direction intersecting the optical axis. The second extending portion may extend in a direction intersecting the optical axis. The second extending portion may be arranged at a distance from the first extending portion. In this case, the darkness between the first extending portion and the second extending portion allows the first extending portion and the second extending portion to stand out. Thereby, conspicuity can be improved.

The outer lens may further include a third light transmitting portion. At least a portion of the third light transmitting portion may be disposed around the first light transmitting portion and the second light transmitting portion. An inner surface of the third light transmitting portion may be embossed. In this case, since the light is irregularly reflected by the embossed surface, an internal structure of the lighting device can be made hard to see from the outside.

A length of the second inclined surface along an inclined direction of the second inclined surface may be greater than a length of the first inclined surface along an inclined direction of the first inclined surface. In this case, a large amount of light can be guided from the light emitting diode to the second light transmitting portion.

The second inclined surface may have a flat shape. In this case, the control of the light reflection direction becomes easy.

The first inclined surface may have a shape curved around the optical axis when viewed from the optical axis direction. In this case, the light irradiation range on the first inclined surface can be expanded. Thereby, conspicuity can be improved.

The first light transmitting portion may include a flat surface provided on an outer surface of the first light transmitting portion. The flat surface may be arranged perpendicular to the optical axis of the light emitting diode. In this case, strong light can be emitted in the optical axis direction through the flat surface. Thereby, the conspicuity from the optical axis direction can be improved.

The flat surface may be located between the first inclined surface and the second inclined surface when viewed from the optical axis direction. In this case, while irradiating strong light in the optical axis direction from the flat surface, it is possible to irradiate light over a wide range by the first inclined surface and the second inclined surface.

At least a part of the flat surface may overlap with the light emitting diode when viewed from the optical axis direction. In this case, strong light can be emitted from the flat surface in the optical axis direction.

The second inclined surface may overlap with the light emitting diode when viewed from the optical axis direction. In this case, a large amount of light can be reflected toward the second light transmitting portion by the second inclined surface. Thereby, the light can be spread over a wide range in the second light transmitting portion.

The first light transmitting portion may have a circular shape when viewed from the optical axis direction. In this case, it is possible to irradiate light over a wide range by the first light transmitting portion.

The lighting device may be a flasher. In this case, the conspicuity of the flasher can be improved.

A second aspect according to the present invention is a straddled vehicle. The straddled vehicle may include the lighting device described above.

DETAILED DESCRIPTION

Figure 1:
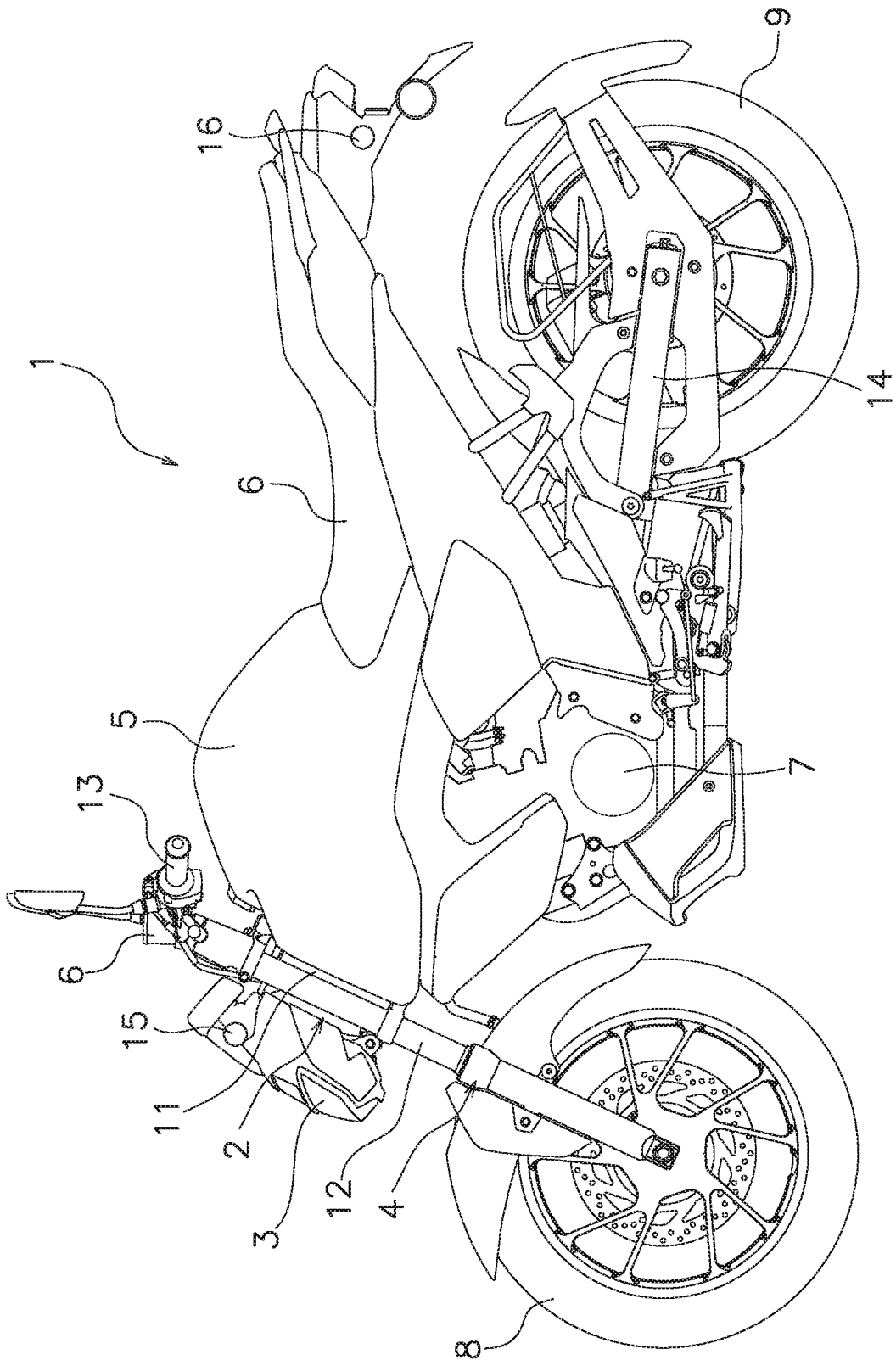
FIG. 1 is a side view of a straddled vehicle according to an embodiment.

Hereinafter, a straddled vehicle according to an embodiment will be described with reference to the drawings. FIG. 1 is a side view of a straddled vehicle 1 according to the embodiment. The straddled vehicle 1 is a so-called street motorcycle. The straddled vehicle 1 includes a body frame 2, a headlight 3, a steering device 4, a fuel tank 5, a seat 6, a power unit 7, a front wheel 8, and a rear wheel 9.

The body frame 2 includes a head pipe 11. The head pipe 11 rotatably supports the steering device 4. The headlight 3 is arranged in front of the head pipe 11. The steering device 4 includes a front fork 12 and a handle 13. The front fork 12 rotatably supports the front wheel 8. The handle 13 is connected to an upper portion of the front fork 12.

The fuel tank 5 is arranged behind the head pipe 11. The seat 6 is arranged behind the fuel tank 5. The power unit 7 is arranged below the fuel tank 5. The power unit 7 includes, for example, an internal combustion engine. However, the power unit 7 may include another power source such as an electric motor. The rear wheel 9 is rotatably supported by the rear arm 14. The rear wheel 9 is supported by the body frame 2 via the rear arm 14.

Figure 2:
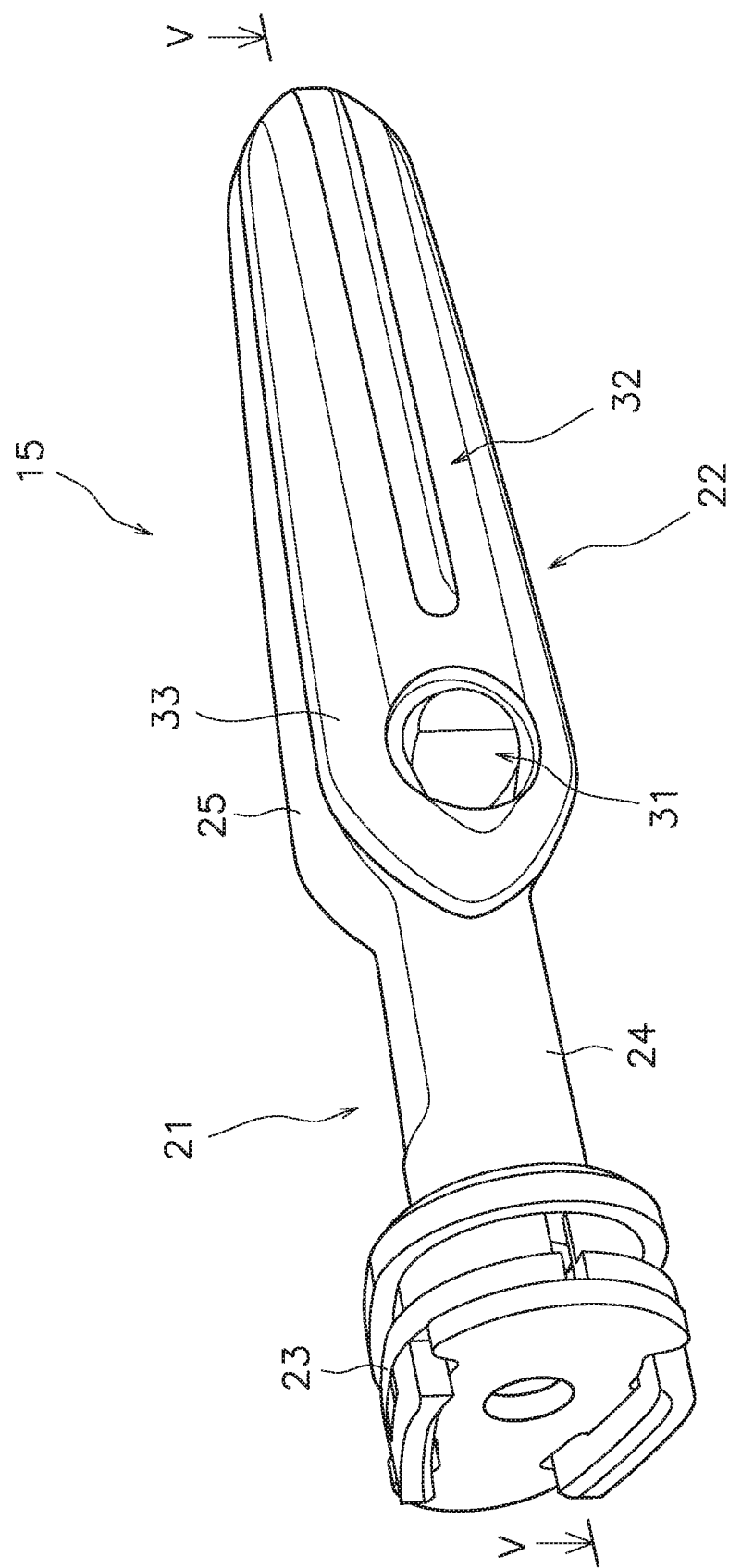
FIG. 2 is a perspective view of a lighting device.

The straddled vehicle 1 includes lighting devices 15 and 16. The lighting devices 15 and 16 are flashers, and blink in response to a rider's operation. FIG. 2 is a perspective view of the lighting device 15. Hereinafter, the front lighting device 15 will be described, but the rear lighting device 16 has the same configuration as the front lighting device 15.

As illustrated in FIG. 2, the lighting device 15 includes a housing 21 and an outer lens 22. The housing 21 is made of an opaque material. For example, the housing 21 is made of resin. However, the housing 21 may be formed of another material such as metal. The housing 21 includes a mounting portion 23, a support portion 24, and a main body 25. The mounting portion 23 is mounted on the straddled vehicle 1. The support portion 24 extends in the vehicle width direction from the mounting portion 23. The main body 25 extends from the support portion 24 in the vehicle width direction.

Figure 3:
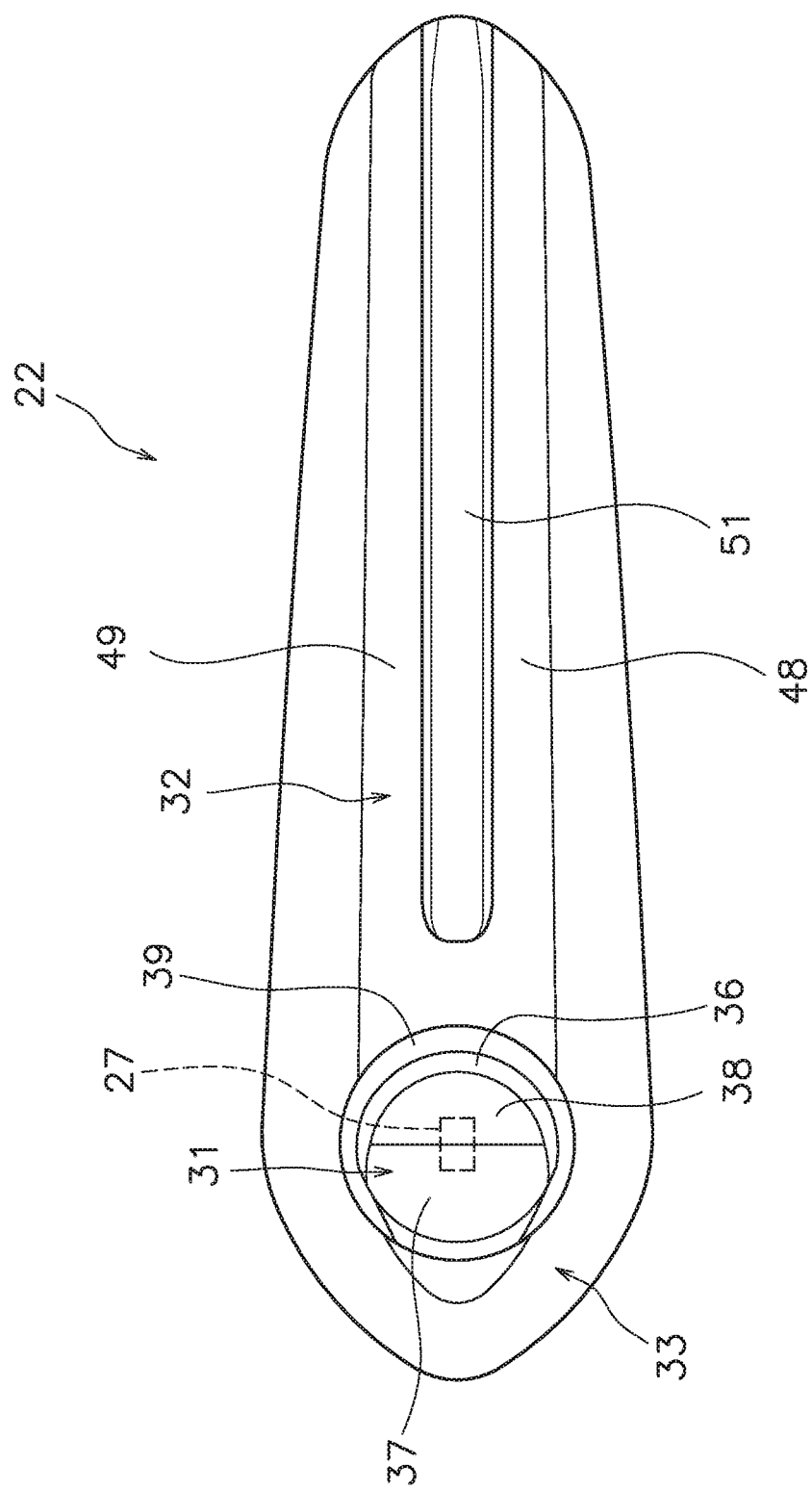
FIG. 3 is a front view of an outer lens.
Figure 4:
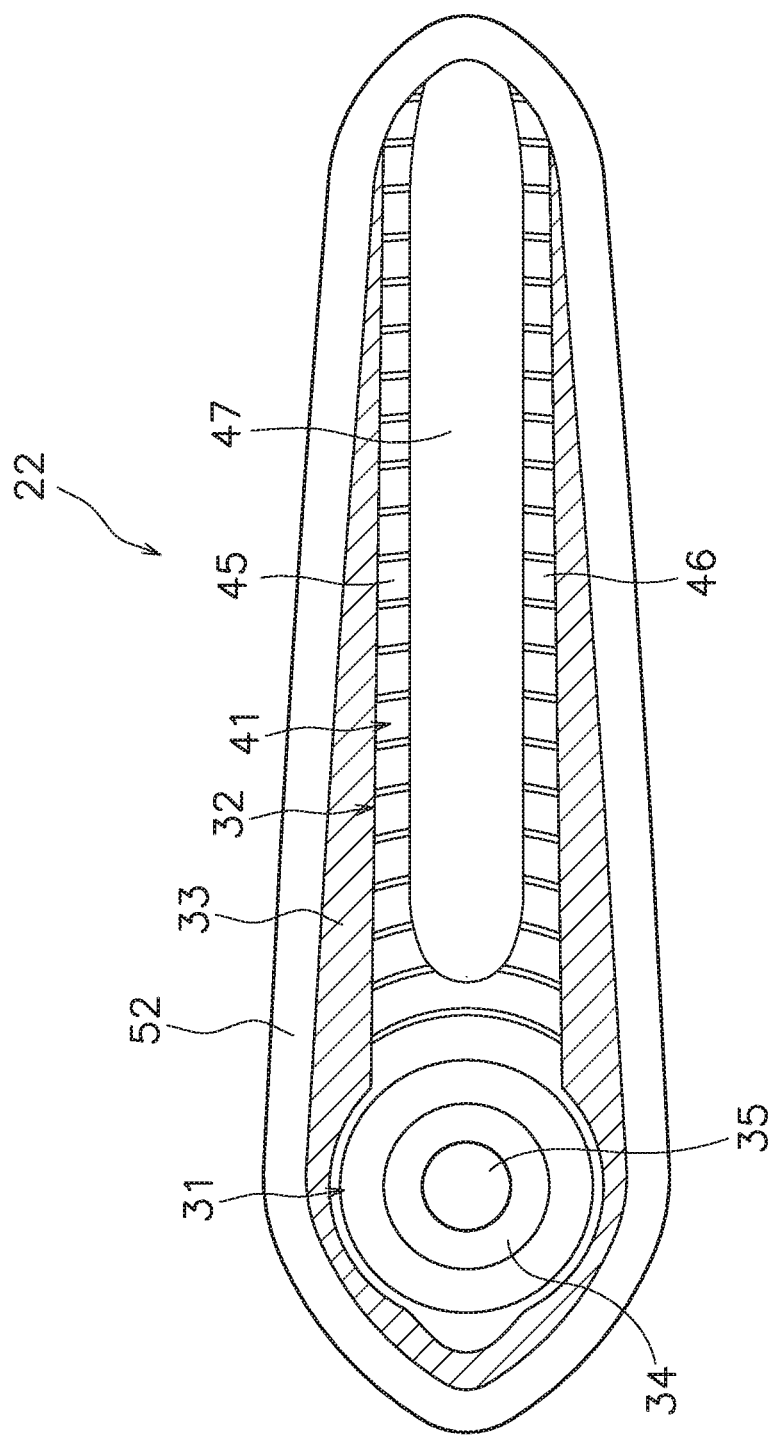
FIG. 4 is a rear view of the outer lens.

The outer lens 22 is attached to the main body 25 of the housing 21. The outer lens 22 is formed of a translucent material. The outer lens 22 is made of resin, for example. FIG. 3 is a front view of the outer lens 22. FIG. 4 is a rear view of the outer lens 22. In the following description, the direction from the main body 25 of the housing 21 toward the outer lens 22 is defined as the front, and the opposite direction is defined as the rear.

Figure 5:
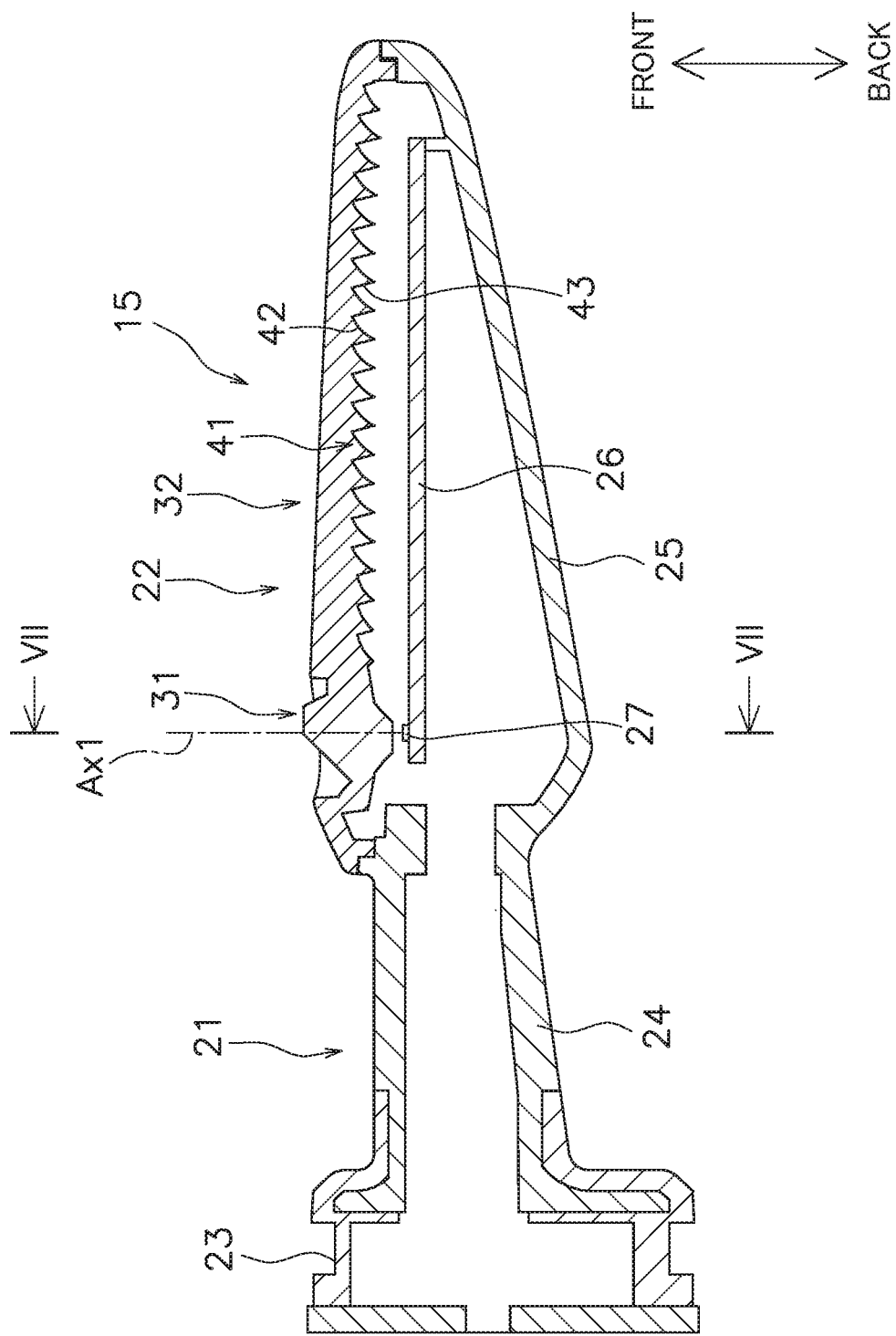
FIG. 5 is a sectional view of the lighting device taken along line V-V in FIG. 2.

FIG. 5 is a sectional view taken along line V-V in FIG. 2. As illustrated in FIG. 5, the lighting device 15 includes a substrate 26 and a light emitting diode 27. The substrate 26 is arranged in the housing 21. The substrate 26 is disposed behind the outer lens 22. The substrate 26 overlaps the outer lens 22 when viewed in the optical axis direction of the light emitting diode 27. The light emitting diode 27 is mounted on the substrate 26. The optical axis Ax1 of the light emitting diode 27 faces in the front-back direction. The light emitting diode 27 overlaps the outer lens 22 in the optical axis direction (Ax1). The number of light emitting diodes provided in the lighting device 15 is one. The lighting device 15 has only one light emitting diode 27. That is, the lighting device 15 has a single light emitting diode 27.

The outer lens 22 extends in a direction perpendicular to the optical axis Ax1 of the light emitting diode 27. The outer lens 22 has a shape longer in the vehicle width direction than in the vertical direction of the straddled vehicle 1. In the following description, the direction perpendicular to the optical axis Ax1 of the light emitting diode 27 and the direction in which the outer lens 22 extends is defined as the longitudinal direction. The direction perpendicular to the optical axis Ax1 of the light emitting diode 27 and perpendicular to the longitudinal direction is defined as the transverse direction. Note that the vertical direction includes not only a completely vertical direction but also a substantially vertical direction. That is, the vertical direction includes a range of ±20 degrees from the completely vertical direction.

The outer lens 22 has a shape that tapers toward one side in the longitudinal direction. The outer lens 22 includes a first light transmitting portion 31, a second light transmitting portion 32, and a third light transmitting portion 33. The first light transmitting portion 31, the second light transmitting portion 32, and the third light transmitting portion 33 are integrally formed.

The first light transmitting portion 31 is disposed at a position where the length in the transverse direction of the outer lens 22 is maximized. The first light transmitting portion 31 has a circular shape when viewed in the optical axis direction (Ax1) of the light emitting diode 27. The first light transmitting portion 31 overlaps the light emitting diode 27 when viewed from the optical axis direction (Ax1).

The second light transmitting portion 32 is disposed at a position that does not overlap with the light emitting diode 27 in the optical axis direction (Ax1). The second light transmitting portion 32 is disposed adjacent to the first light transmitting portion 31 in the longitudinal direction. The second light transmitting portion 32 extends in the longitudinal direction. The second light transmitting portion 32 is larger than the first light transmitting portion 31 in the longitudinal direction. The second light transmitting portion 32 is larger than half of the entire length of the outer lens 22 in the longitudinal direction. The second light transmitting portion 32 is smaller than the first light transmitting portion 31 in the transverse direction. The outer surface of the second light transmitting portion 32 is inclined rearward toward the tip end side of the lighting device 15. Alternatively, the outer surface of the second light transmitting portion 32 may be inclined forward toward the tip end side of the lighting device 15.

Figure 6:
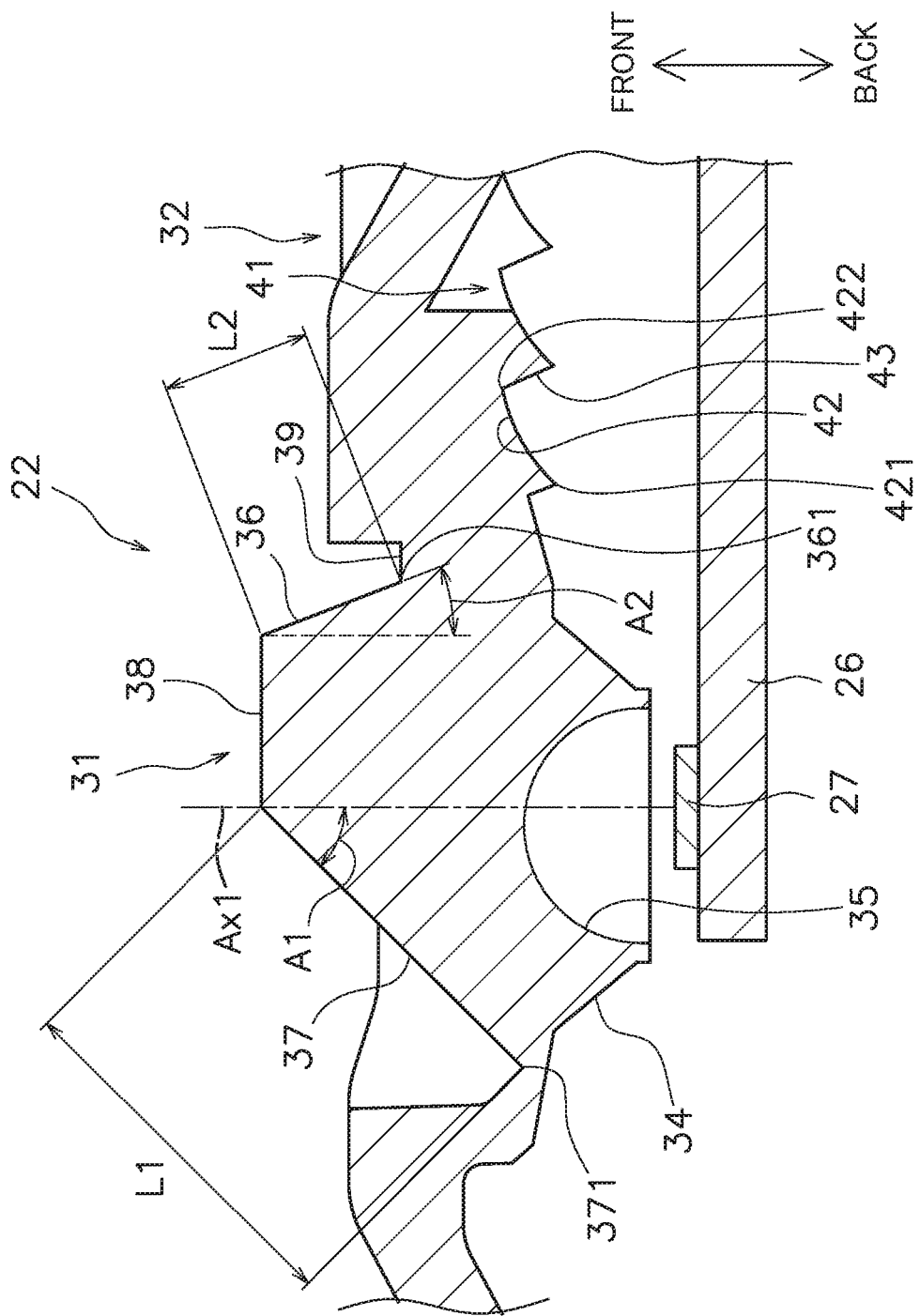
FIG. 6 is an enlarged sectional view of the outer lens.
Figure 7:
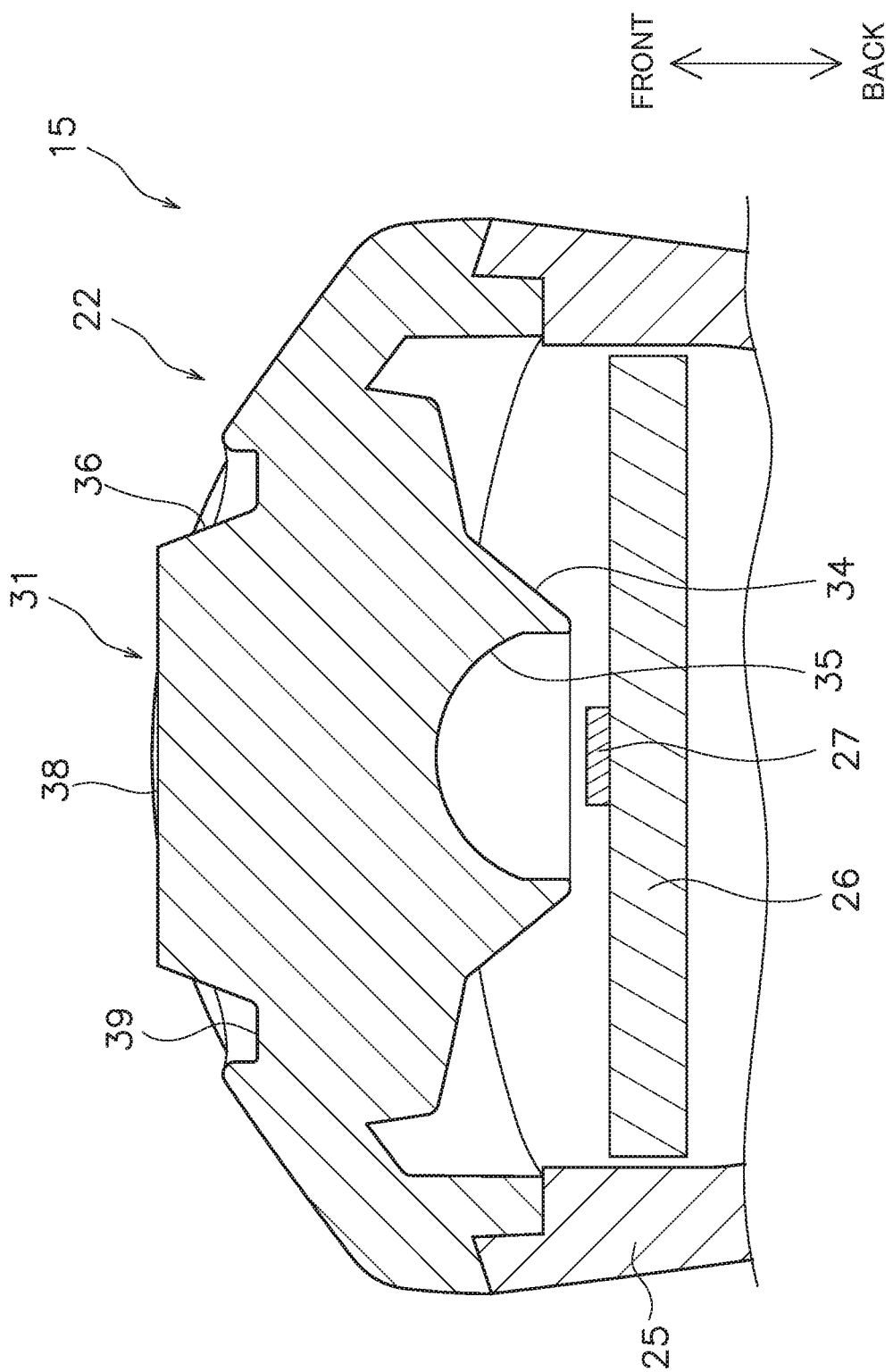
FIG. 7 is a sectional view of the lighting device taken along line VII-VII in FIG. 5.
Figure 8:
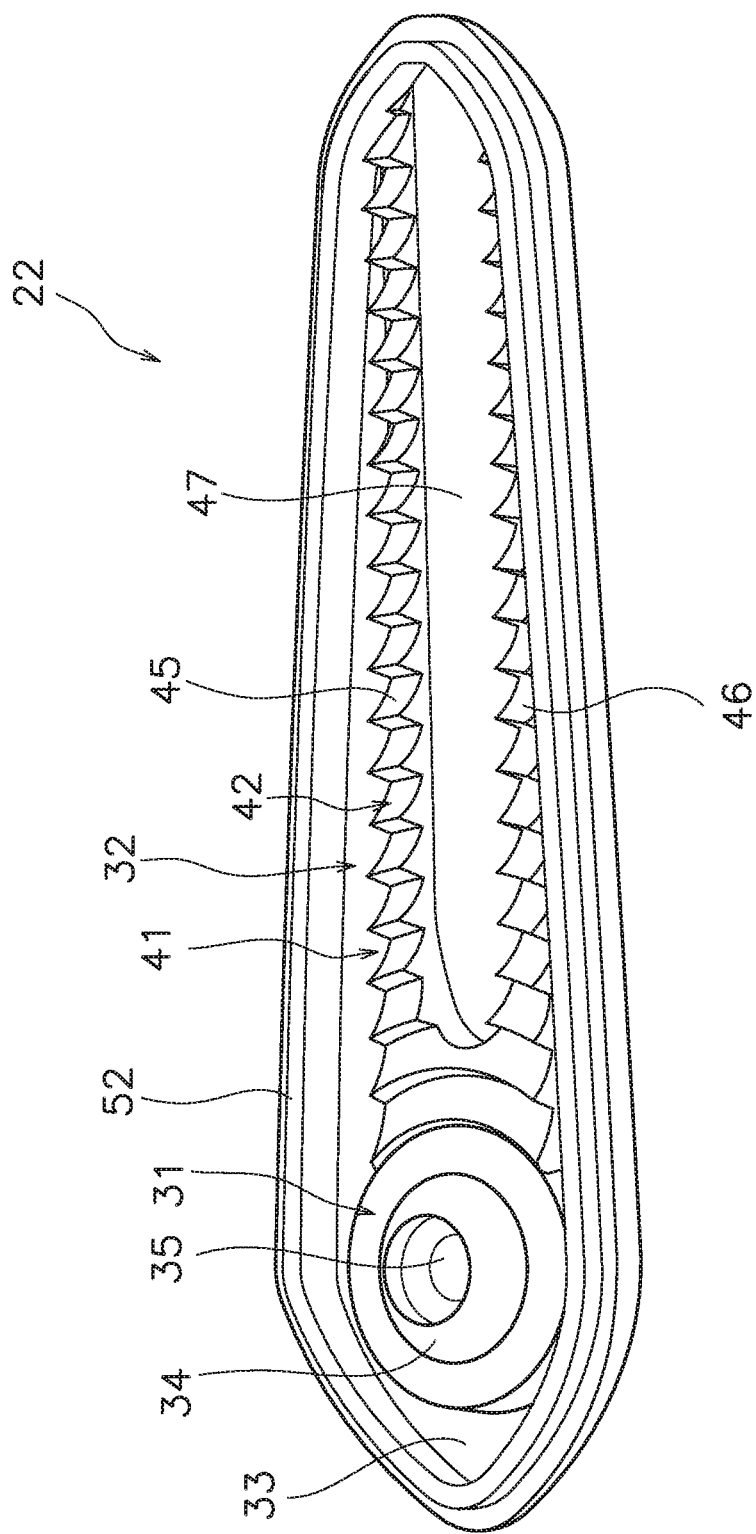
FIG. 8 is a perspective view showing an inner surface of the outer lens.

FIG. 6 is an enlarged sectional view of the outer lens 22. FIG. 7 is a sectional view taken along the line VII-VII in FIG. 5. FIG. 8 is a perspective view showing the inner surface of the outer lens 22. As illustrated in FIGS. 6 to 8, the inner surface of the first light transmitting portion 31 includes a protrusion 34 and a recess 35. The protrusion 34 has a circular outer shape. The recess 35 is provided on the top of the protrusion 34. The recess 35 has a hemispherical shape. The light emitting diode 27 is arranged to face the recess 35 in the optical axis direction (Ax1). The light emitting diode 27 overlaps the recess 35 when viewed from the optical axis direction (Ax1).

Figure 9:
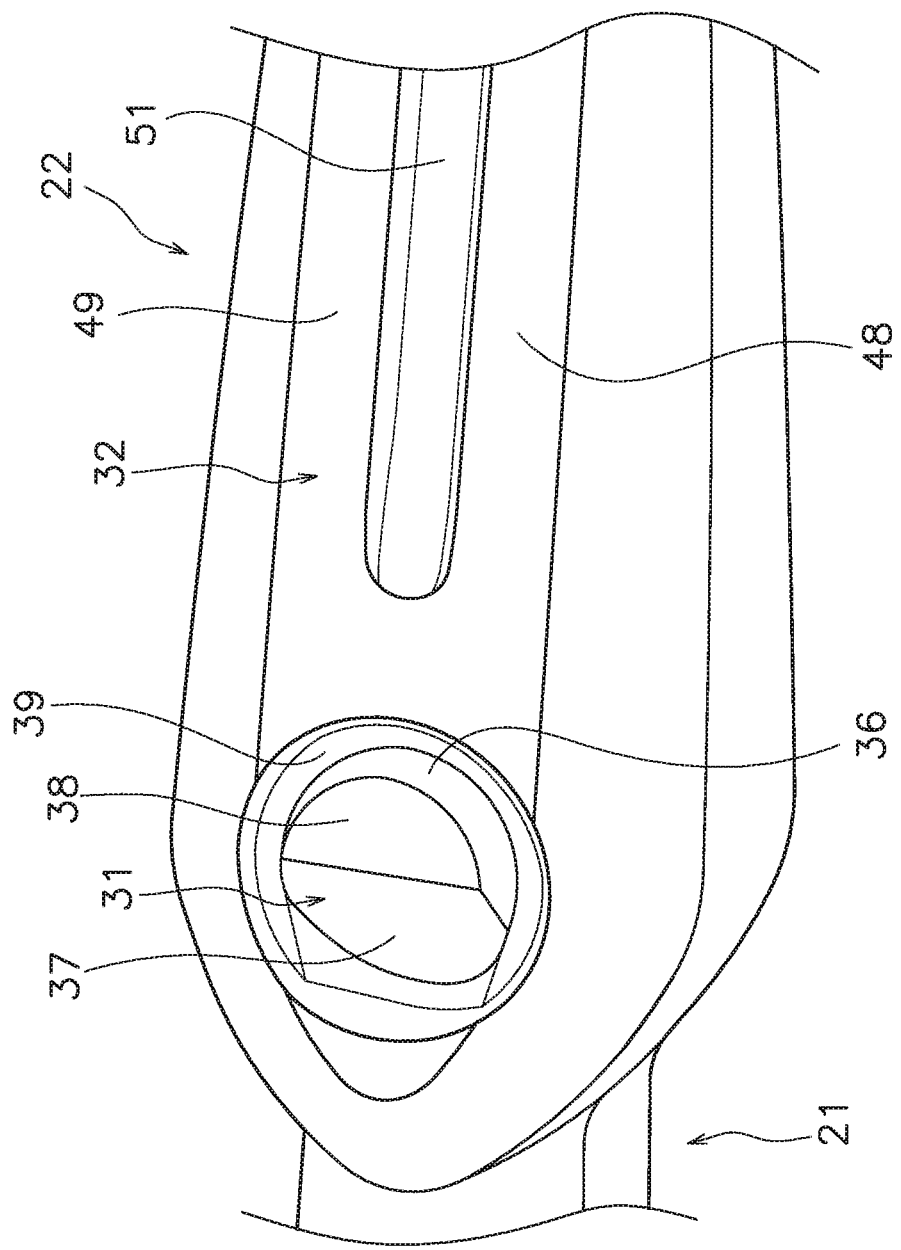
FIG. 9 is an enlarged perspective view showing an outer surface of the outer lens.

FIG. 9 is an enlarged perspective view showing the outer surface of the outer lens 22. As illustrated in FIG. 9, an outer surface of the first light transmitting portion 31 includes a first inclined surface 36 and a second inclined surface 37. The first inclined surface 36 has a shape curved around the optical axis Ax1 when viewed from the optical axis direction (Ax1). The first inclined surface 36 has an arc shape when viewed from the optical axis direction (Ax1). As illustrated in FIG. 6, the first inclined surface 36 is inclined with respect to the optical axis Ax1 of the light emitting diode 27. The first inclined surface 36 reflects the light from the light emitting diode 27 guided in the first light transmitting portion 31 toward the outside of the outer lens 22.

The second inclined surface 37 has a flat shape inclined with respect to the optical axis Ax1 of the light emitting diode 27. The second inclined surface 37 overlaps with the light emitting diode 27 when viewed from the optical axis direction (Ax1). The second inclined surface 37 reflects the light from the light emitting diode 27 guided in the first light transmitting portion 31 toward the second light transmitting portion 32, and guides the light into the second light transmitting portion 32. The inclination angle A1 of the second inclined surface 37 with respect to the optical axis Ax1 is larger than the inclination angle A2 of the first inclined surface 36 with respect to the optical axis Ax1. The length L1 of the second inclined surface 37 along the inclined direction of the second inclined surface 37 is larger than the length L2 of the first inclined surface 36 along the inclined direction of the first inclined surface 36.

The outer surface of the first light transmitting portion 31 includes a flat surface 38. The flat surface 38 is arranged to be perpendicular to the optical axis Ax1 of the light emitting diode 27. The flat surface 38 is located between the first inclined surface 36 and the second inclined surface 37 when viewed from the optical axis direction (Ax1). At least a part of the flat surface 38 overlaps the light emitting diode 27 when viewed from the optical axis direction (Ax1). A rear end 371 of the second inclined surface 37 is located rearward of a rear end 361 of the first inclined surface 36. That is, the rear end 371 of the second inclined surface 37 is located closer to the light emitting diode 27 than the rear end 361 of the first inclined surface 36 in the optical axis direction (Ax1).

The second inclined surface 37 is larger than the first inclined surface 36 in the longitudinal direction of the outer lens 22. The second inclined surface 37 is larger than the flat surface 38 in the longitudinal direction of the outer lens 22. The second inclined surface 37 is arranged adjacent to the flat surface 38 in the longitudinal direction. The first inclined surface 36 is arranged adjacent to the flat surface 38 in the longitudinal direction. The first inclined surface 36 is arranged adjacent to the second inclined surface 37 in the transverse direction.

The outer surface of the first light transmitting portion 31 includes a groove 39. The groove 39 has a circular outer shape. The groove 39 is disposed around the first inclined surface 36 and the second inclined surface 37 when viewed from the optical axis direction (Ax1). The groove 39 is arranged between the second light transmitting portion 32 and the first inclined surface 36. The groove 39 is arranged between the third light transmitting portion 33 and the second inclined surface 37.

An inner surface of the second light transmitting portion 32 includes a reflection surface 41. The reflection surface 41 reflects the light guided from the second inclined surface 37 into the second light transmitting portion 32 toward the outside of the outer lens 22. As illustrated in FIG. 6, the reflection surface 41 includes a plurality of inclined surfaces 42. In the drawings, only one of the inclined surfaces 42 is denoted by a reference numeral, and the reference numerals of the other inclined surfaces 42 are omitted. Each of the inclined surfaces 42 has a curved shape. Each of the inclined surfaces 42 has a shape that bulges forward.

The rear end 371 of the second inclined surface 37 is located forward of the rear ends 421 of the inclined surfaces 42. The rear end 371 of the second inclined surface 37 is located rearward of the front ends 422 of the inclined surfaces 42. The inclined surfaces 42 are arranged side by side in the longitudinal direction. A plurality of steps 43 are provided between the inclined surfaces 42.

As illustrated in FIG. 4, the reflection surface 41 has a bifurcated shape. The reflection surface 41 includes a first extending portion 45 and a second extending portion 46. The first extending portion 45 and the second extending portion 46 extend in the longitudinal direction. The second extending portion 46 is arranged at a distance from the first extending portion 45. The reflection surface 41 includes an inner recess 47. The inner recess 47 is arranged between the first extending portion 45 and the second extending portion 46. The inner recess 47 extends in the longitudinal direction.

As illustrated in FIG. 3, the outer surface of the second light transmitting portion 32 includes a third extending portion 48 and a fourth extending portion 49. The third extending portion 48 overlaps with the first extending portion 45 when viewed from the optical axis direction (Ax1). The fourth extending portion 49 overlaps the second extending portion 46 when viewed from the optical axis direction (Ax1). The outer surface of the second light transmitting portion 32 includes an outer recess 51. The outer recess 51 is disposed between the third extending portion 48 and the fourth extending portion 49. The outer recess 51 extends in the longitudinal direction. When viewed from the optical axis direction (Ax1), the outer recess 51 overlaps the inner recess 47. The outer recess 51 is smaller than the inner recess 47 in the transverse direction.

The third light transmitting portion 33 is disposed around the first light transmitting portion 31 and the second light transmitting portion 32. In FIG. 4, the third light transmitting portion 33 is hatched for easy understanding. The third light transmitting portion 33 is arranged between an end surface 52 of the outer lens 22 and the first light transmitting portion 31 when viewed from the optical axis direction (Ax1). The end surface 52 of the outer lens 22 is a mounting surface to the housing 21. When viewed from the optical axis direction (Ax1), the third light transmitting portion 33 is disposed between the end surface 52 of the outer lens 22 and the second light transmitting portion 32. The inner surface of the third light transmitting portion 33 is embossed. That is, a plurality of minute portions of unevenness are provided on the inner surface of the third light transmitting portion 33.

Figure 10:
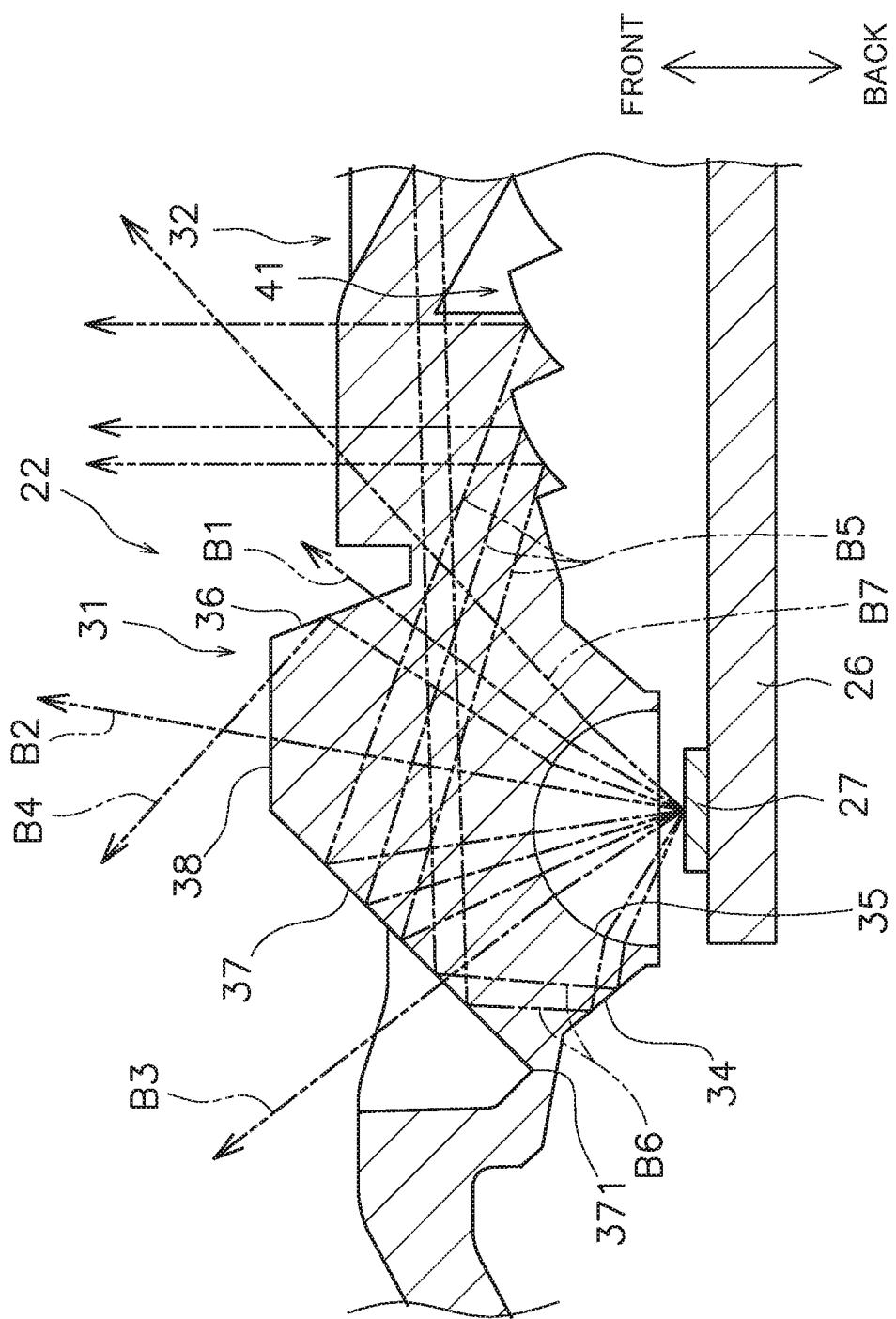
FIG. 10 is a sectional view of the lighting device showing a light guide path in the outer lens.

In the lighting device 15 according to the present embodiment described above, the light from the light emitting diode 27 is guided inside the outer lens 22 and is irradiated to the outside of the outer lens 22. More specifically, as indicated by arrows B1-B3 in FIG. 10, the light from the light emitting diode 27 guided in the first light transmitting portion 31 passes through the first inclined surface 36, the second inclined surface 37, and the flat surface 38 and is irradiated toward the outside of the outer lens 22. In addition, as indicated by an arrow B4, a part of the light toward the first inclined surface 36 is reflected by the first inclined surface 36 and is irradiated toward the outside of the outer lens 22. Thereby, the light can be irradiated in a wide range.

Further, as indicated by arrows B5 and B6, the light from the light emitting diode 27 guided in the first light transmitting portion 31 is reflected toward the second light transmitting portion 32 by the second inclined surface 37. Specifically, as illustrated by the arrow B5, the light is reflected on the second inclined surface 37 toward the second light transmitting portion 32. As illustrated by the arrow B6, the light from the light emitting diode 27 is reflected by the protrusion 34 toward the second inclined surface 37, and further reflected on the second inclined surface 37 toward the second light transmitting portion 32. Thereby, a large amount of light from the light emitting diode 27 is guided in the second light transmitting portion 32. The light guided in the second light transmitting portion 32 is reflected on the reflection surface 41 and is irradiated to the outside of the outer lens 22. In addition, as indicated by an arrow B7, a part of the light from the light emitting diode 27 is guided directly in the second light transmitting portion 32 without passing through the second inclined surface 37, and is irradiated outside the outer lens 22. As described above, in the lighting device 15 according to the present embodiment, the light from the single light emitting diode 27 can be divided into the first light transmitting portion 31 and the second light transmitting portion 32 and is irradiated outward.

The inclination angle A1 of the second inclined surface 37 with respect to the optical axis Ax1 is larger than the inclination angle A2 of the first inclined surface 36 with respect to the optical axis Ax1. Therefore, although the second light transmitting portion 32 is longer than the first light transmitting portion 31 in the longitudinal direction of the outer lens 22, light can reach the wide range of the second light transmitting portion 32. Thereby, the conspicuity of the lighting device 15 can be improved while suppressing an increase in manufacturing cost.

As described above, one embodiment of the present invention has been described, but the present invention is not limited to the above embodiment, and various changes can be made without departing from the gist of the invention. The straddled vehicle is not limited to a street motorcycle, and may be another vehicle such as a scooter or a moped. The lighting device is not limited to a flasher, and may be another device such as a position light or a headlight.

In the above embodiment, the front and rear lighting devices 15 and 16 have the same structure. However, only the front lighting device may have the structure of the lighting device 15 of the above embodiment. Alternatively, only the rear lighting device may have the structure of the lighting device 15 of the above embodiment.

In the above-described embodiment, the lighting device 15 is arranged such that the longitudinal direction of the lighting device 15 faces the vehicle width direction. However, the direction in which the lighting device 15 is arranged is not limited to that in the above embodiment, and may be changed. For example, the lighting device 15 may be arranged such that the longitudinal direction of the lighting device 15 is oriented in the vertical direction of the straddled vehicle 1.

The structure of the housing 21 or the outer lens 22 is not limited to that of the above embodiment, and may be changed. For example, the shape and/or arrangement of the first light transmitting portion 31 may be changed. The shape and/or arrangement of the second light transmitting portion 32 may be changed. The shape and/or arrangement of the third light transmitting portion 33 may be changed.

What is claimed is:

1. A lighting device for a straddled vehicle, comprising:
a housing;
a single light emitting diode; and
an outer lens attached to the housing, extending in a direction perpendicular to an optical axis of the light emitting diode, and having translucency; wherein
the outer lens includes
a first light transmitting portion overlapping the light emitting diode in an optical axis direction of the light emitting diode, and
a second light transmitting portion disposed at a non-overlapping position with the light emitting diode in the optical axis direction,
the first light transmitting portion and the second light transmitting portion are integrally formed,
the second light transmitting portion is longer than the first light transmitting portion in a longitudinal direction of the outer lens,
the first light transmitting portion includes
a first inclined surface provided on an outer surface of the first light transmitting portion and inclined with respect to the optical axis of the light emitting diode, and
a second inclined surface provided on the outer surface of the first light transmitting portion and inclined with respect to the optical axis of the light emitting diode,
the first inclined surface guides light from the light emitting diode guided in the first light transmitting portion toward an outside of the outer lens,
an inclination angle of the second inclined surface with respect to the optical axis is larger than an inclination angle of the first inclined surface with respect to the optical axis, and
the second inclined surface reflects the light from the light emitting diode guided in the first light transmitting portion toward the second light transmitting portion, and guides the light into the second light transmitting portion, and
a length of the second inclined surface along an inclined direction of the second inclined surface is greater than a length of the first inclined surface along an inclined direction of the first inclined surface.

2. The lighting device according to claim 1, wherein
an inner surface of the second light transmitting portion includes a reflection surface that reflects the light guided into the second light transmitting portion from the second inclined surface toward the outside of the outer lens.

3. The lighting device according to claim 2, wherein
the reflection surface includes a plurality of inclined surfaces.

4. The lighting device according to claim 3, wherein
each of the plurality of inclined surfaces has a curved shape.

5. The lighting device according to claim 2, wherein
the reflection surface includes
a first extending portion extending in a direction intersecting the optical axis, and
a second extending portion extending in a direction intersecting the optical axis and spaced from the first extending portion.

6. The lighting device according to claim 1, wherein
the outer lens further includes a third light transmitting portion at least partially disposed around the first light transmitting portion and the second light transmitting portion, and
an inner surface of the third light transmitting portion is embossed.

7. The lighting device according to claim 1, wherein
the second inclined surface has a flat shape.

8. The lighting device according to claim 1, wherein
the first inclined surface has a shape curved around the optical axis when viewed from the optical axis direction.

9. The lighting device according to claim 1, wherein
the first light transmitting portion includes a flat surface provided on an outer surface of the first light transmitting portion, and
the flat surface is disposed perpendicularly to the optical axis of the light emitting diode.

10. The lighting device according to claim 9, wherein
the flat surface is located between the first inclined surface and the second inclined surface when viewed from the optical axis direction.

11. The lighting device according to claim 9, wherein
at least a part of the flat surface overlaps with the light emitting diode when viewed from the optical axis direction.

12. The lighting device according to claim 1, wherein
the second inclined surface overlaps with the light emitting diode when viewed from the optical axis direction.

13. The lighting device according to claim 1, wherein
the first light transmitting portion has a circular shape when viewed from the optical axis direction.

14. The lighting device according to claim 1, wherein
the lighting device is a flasher.

15. The lighting device according to claim 1, wherein
in the optical axis direction, a rear end of the second inclined surface is located closer to the light emitting diode than a rear end of the first inclined surface.

16. A straddled vehicle comprising the lighting device according to claim 1.

17. The lighting device according to claim 3, wherein
the reflection surface includes
a first extending portion extending in a direction intersecting the optical axis, and
a second extending portion extending in a direction intersecting the optical axis and spaced from the first extending portion.

18. The lighting device according to claim 4, wherein
the reflection surface includes
a first extending portion extending in a direction intersecting the optical axis, and
a second extending portion extending in a direction intersecting the optical axis and spaced from the first extending portion.

* * * * *